United States Patent [19]
Smith et al.

[11] Patent Number: 5,941,996
[45] Date of Patent: Aug. 24, 1999

[54] DISTRIBUTED NETWORK AGENTS

[75] Inventors: Pamela H. Smith, Lawrenceville; Richard Koch, Monmouth Jct., both of N.J.

[73] Assignee: Merrill Lynch & Company, Incorporated, New York, N.Y.

[21] Appl. No.: 08/900,763

[22] Filed: Jul. 25, 1997

[51] Int. Cl.⁶ .............................. G06F 17/30; G06F 11/30
[52] U.S. Cl. .................................. 714/47; 714/48; 714/57
[58] Field of Search ................................. 714/47, 46, 39, 714/48, 57; 395/200.32

[56] References Cited

U.S. PATENT DOCUMENTS 5,799,317   8/1998   He et al. ................................. 707/104

*Primary Examiner*—Ly V. Hua
*Attorney, Agent, or Firm*—Hopgood, Calmafde, Kalil & Judlowe, LLP

[57] ABSTRACT

A message retrieval utility is provided with the capability of running independently of an operator and having the ability to access and retrieve data from individual workstations. The messages retrieved include recorded events, decoded according to the specific DLLs on the same workstation that generated the event. Once the event logs are retrieved from the individual workstations, system agents filters and prioritizes the event messages for presentation to system administrators. The agents are capable of performing analyses on the event messages being generated to anticipate and prevent more serious events in the future. Agents may also communicate with each other to analyze performance.

1 Claim, 6 Drawing Sheets

| ID | Error | EventLevel | Comment | Type | Event | Action | Default |
|---|---|---|---|---|---|---|---|
| 1 | ■ | 1 | The Compaq System Management | Warning | 4141 | Log | 1 |
| 2 |  | 0 | The Event log service was started | Information | 6005 | Ignore | 0 |
| 3 |  | 0 | The browser has forced an election | Information | 6033 | Ignore | 0 |
| 4 |  | 1 | The redirector has timed out a red | Warning | 3013 | Log | 1 |

FIG. 7

| ID | Machine_Name | Event | Description | EventTime |
|---|---|---|---|---|
| 1 | SDIX2 | 2511 | The server service was unable to recreate the share DougStuff because th | 51417 2 |
| 2 | SDIX2 | 2511 | The server service was unable to recreate the share ABWRITER because the | 51417 2 |
| 3 | SDIX2 | 7024 | The Messenger service terminated with service-specific error 2105 - 5141 | 51417 2 |
| 4 | DBREUNINGER2 | 41 | The file system structure on the disk is corrupt and unusable.Please run | 5192052 |
| 5 | JPAI | 7000 | The McFee TaskManager service failed to start due to the following error | 519 827 |
| 6 | DBREUNINGER2 | 14 | The HTTP Filter DLL D:\Microsoft FrontPage\bin\rpexedll.dll failed to load | 5151419 |
| 7 | JPAI | 7013 | Logon attempt with current password failed with the following error | 519 827 |
| 8 | JPAI | 7000 | The McAfee Alert Manager service failed to start due to the following error | 519 827 |

DISTRIBUTED NETWORK AGENTS

FIELD OF THE INVENTION

The invention relates generally to system components for monitoring system performance. More specifically, the invention relates to system agents capable of monitoring the performance of remote workstations and responding and notifying the administrator accordingly.

BACKGROUND OF THE INVENTION

As computers have increasingly become an integral part of almost all facets of business operation, they have also become increasingly more interconnected. The recent proliferation of the use of intranets is merely a step in the progression from LANs to WANs and beyond. As a result, the use of the global Internet to connect far-flung computer groups, servers and workstations is becoming the norm, rather than the exception.

As has always been the case with any office equipment, there is a need to monitor and maintain the operation of computer workstations. In the early days of computers, this usually involved the personal attention of MIS personnel, who would personally perform diagnostics on each individual workstation. LANs allowed for some integration of the monitoring functions, with centralized computers having the capability to collect limited performance information for computers directly hardwired to the central computer.

More recently, some functionality for the monitoring of performance and error states in interconnected workstations has been incorporated directly into the operating systems that allow for the interconnectivity. For example, the various embodiments of Windows, such as Windows for Workgroups and Windows NT, record any error messages in message logs on the individual workstations. These messages are stored as cryptic messages, such as references to more detailed error information contained within the application that generated the error in the first place. In the case of Windows applications, the information to "decode" the error messages are contained in the individual message dynamic linked libraries ("DLLs") associated with the application that initially caused the error or system event.

In the Windows NT environment, administrative tools allow for a server connected to a plurality of workstations to collect all of the error messages in a centralized error log. This allows for a more centralized monitoring of those workstations. A system administrator can only review the single central error log, rather than each individual workstation to discover if there are any problems. Unfortunately, this is the only way to centrally monitor the handful of workstations directly connected to the server. The business realities of today demand practically global reach for any large corporation that wishes to survive. For example, in the financial services industry, this often means branch offices in countries and cities separated by large distances, potentially thousands of miles. Having a system administrator at each remote location is redundant and wasteful, as most systems will operate nominally a majority of the time. For a single administrator to log in to various remote groups is also difficult and time consuming. The different time zones also make it difficult for any single or group of administrators to personally monitor, even if accomplished remotely, all of an organization's workstations from a central location.

It is, of course, known that servers and even workstations may be remotely accessed by various means. Whether through phone lines, the internet, satellites, etc., it is possible for an operator to access the files, including the error logs, on remote workstations from a central location. However, if an administrator wanted to use these methods to monitor all of an organization's workstations, it would require connecting to each one individually, retrieving the error logs and then scanning through the logs for important messages. Since everything from a major application failure to a momentary disk access problem is stored in the error logs, this task becomes a near impossibility due to the sheer volume of messages, among other problems.

Even if the administrator could directly connect, it would be difficult to immediately understand the cryptic error logs. Without knowing or accessing the specific DLL on the same machine that generated the error message, the error may be undecipherable. Today, with program updates and bug fixes a constant reality, it is difficult to track the version of a given message DLL on an given machine without accessing those message DLL files as well. Obviously, this compounds the task for the administrator.

At least one program does exist for automating some of these monitoring tasks. The Tivoli Management Environment, currently available through IBM, includes a component called Tivoli/Sentry. This component, while active at a central location, has the capability to automatically access a server at a remote location to retrieve its error log, which the server has gathered from the workstations connected to it.

Tivoli also includes limited functionality to automatically respond to certain errors at the server level. When a workstation forwards an error message to its immediate network server, that server may be preprogrammed with a response action based on certain events. Critical events are also transmitted to a central location for processing and generation of a corrective action, which is sent back to the remote server.

SUMMARY OF THE INVENTION

In view of the deficiencies of the prior art, it is an object of the invention to provide system components that are capable of monitoring the performance of remote systems, at the server and individual workstation level.

It is another object of the invention to provide system components that include intelligence to respond to remote events.

It is a further object of the invention to provide system components that filter the events and report them appropriately to system administrators, based upon a set of predefined rules.

It is yet another object of the invention to provide multiple system components that are capable of monitoring remote systems simultaneously and exchanging information among themselves to improve performance.

It is yet another object of the invention to provide system components that are capable of monitoring remote systems simultaneously to determine system load and determine allocation of system resources.

It is a still further object of the invention to provide system components that access individual workstations to provide meaningful and selective event notification to the administrators.

In accordance with the objects of the invention, a message retrieval utility is provided with the capability of running independently of an operator and having the ability to access and retrieve data from individual workstations. The messages retrieved include recorded events, decoded according to the specific DLLs on the same workstation that generated the event. Once the event logs are retrieved from the individual workstations, system agents filters and prioritizes the event messages for presentation to system administrators. The agents are capable of performing analyses on the event messages being generated to anticipate and prevent more serious events in the future. Agents may also communicate with each other to analyze performance.

BRIEF DESCRIPTION OF THE DRAWINGS

The foregoing and other objects and advantages of the present invention will become apparent to those skilled in the art upon reading the following detailed description of the preferred embodiment in conjunction with a review of the appended drawings, in which.

DETAILED DESCRIPTION OF THE PREFERRED EMBODIMENTS

Figure 1:
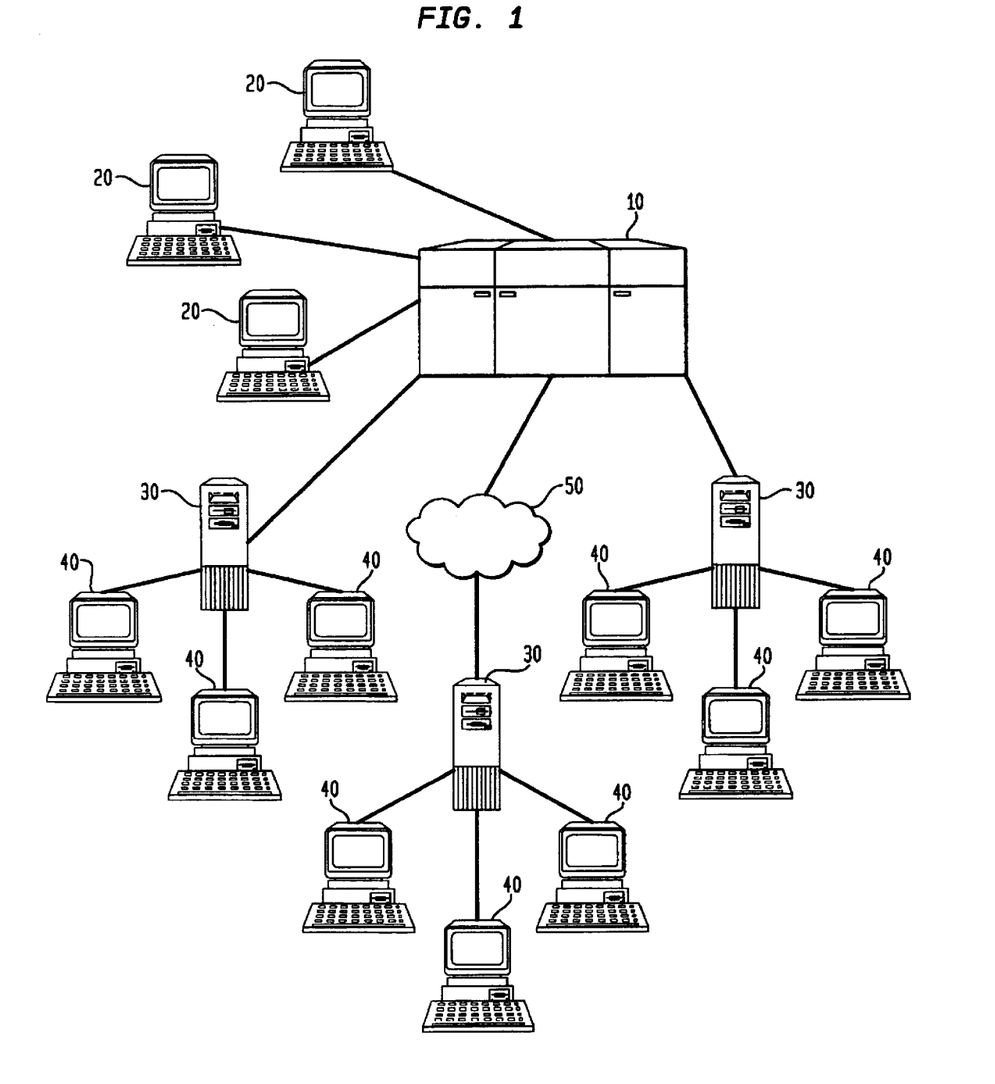
FIG. 1 is an overview schematic of a distributed network of an organization.

Referring now to FIG. 1, an overall schematic diagram of a distributed network is shown. The network includes at least one centralized server 10, which may be accessed by an administrator to review the monitored events of the remote systems. As will be seen below, the present invention may also forward event information to an administrator as needed. The central server may also include local workstations 20 connected directly to the server. In addition, a plurality of remote groups are connected to the centralized server through any known method, such as hardwired (T1, T4), TCP/IP (see internet 50, FIG. 1), or satellite. Within each of the remote groups is at least one gateway server 30 and usually a plurality of workstations 40 connected to the gateway server 30. Each one of the remote groups could represent, for example, a branch office that can perhaps run independently, but is supported by and monitored by central off-site administrators.

Figure 2:
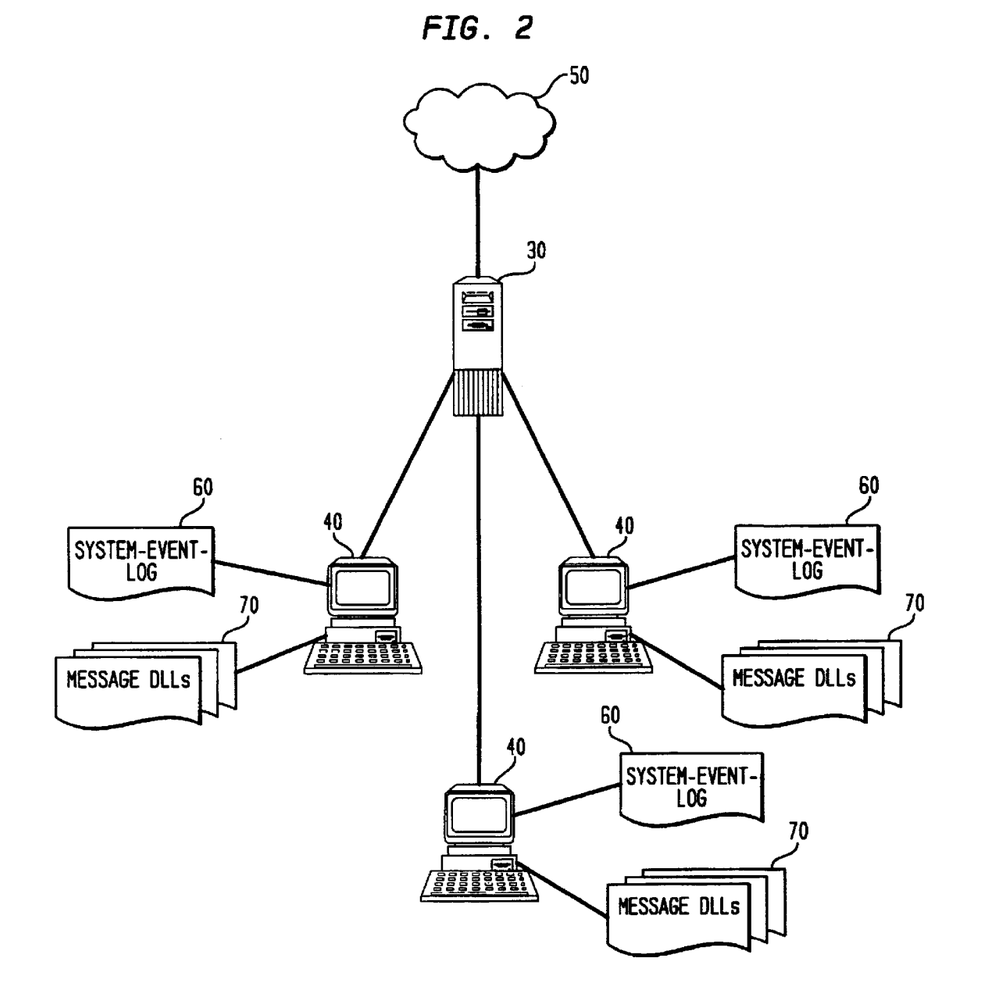
FIG. 2 is a schematic of a portion of the distributed network of FIG. 1.

Referring now to FIG. 2, one of the groups from FIG. 1 is shown in schematic diagram form. The gateway server 30 is shown, along with several workstations 40. Each of the workstations 40 includes its own system-event-log 60, which is constantly updated by each workstations operating system whenever an event occurs. An event is defined by the specific operating system, but in general is a failure of some application, object, or instruction to execute properly. The particular operating system selected for the workstations is irrelevant, so long as events are recorded on a log in some manner. In the preferred embodiment, the workstation operating system is a version of Microsoft Windows, such as Windows for Workgroups or Windows NT.

For most of the events generated by the operating system and recorded in the log, there is an associated message DLL 70 also stored on the workstation. These message DLLs include the correlation between the hexadecimal message IDs in the event log and the actual event that occurred, in brief narrative form. As will be seen below, accessing the specific message DLLs 70 on each workstation is a preferred aspect of the present invention. The event log also includes a system time stamp when the event occurred, as well as the type and severity of error occurred.

One configuration of the present invention involves groups that are connected by an internal network to the centralized server. In this scenario, it is not necessary for the message retrieval utility that will retrieve the messages to make any connections over the internet. In such a case, a message retrieval utility is created, which is preprogrammed with the specific workstation names within the organization's domain. When the utility is initiated, either by an automatic startup or through the intervention of an administrator, the utility will read a number of the workstation names on its internal list and launch threads to monitor those workstations simultaneously by accessing the workstation's system-event-log for events time-stamped within a predetermined period of time, preferably the past one week.

Figure 4:
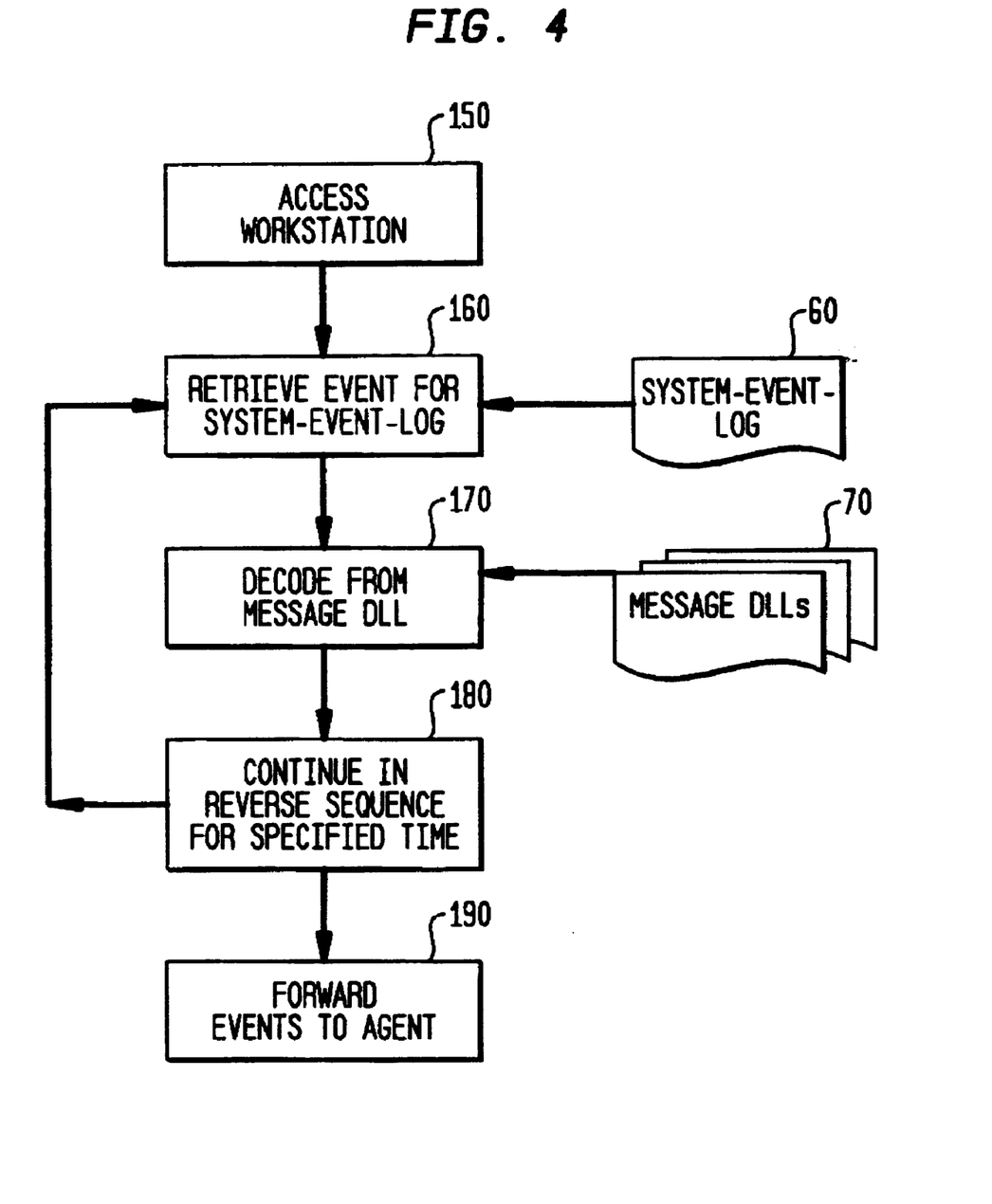
FIG. 4 is a functional schematic of the message retrieval utility accessing a remote workstation according to the present invention.

Each thread reads the system-event-log on the specific workstation (150, 160, FIG. 4) matching the machine name it was generated with using known Microsoft APIs and checks the time stamp of each event to determine if it is in the range it is programmed to retrieve. The event description in the system-event-log is then decoded by the utility (170, FIG. 4). This is accomplished by reading the event-associated message DLL 70 on the same workstation through the RPC calls. By reading the message DLL 70 from the same workstation that generated the event, the problems associated with different versions of DLLs on different machines, or the lack of certain DLLs, is eliminated. Each event that can be decoded is decoded using the proper message DLL.

For those events in the system-event-log that cannot be associated with a message DLL, for example because of a failure to properly access the DLL, the utility has access to the database of previously retrieved events, from which it will retrieve available information regarding similar events in order to form a brief description. Preferably, this event database (110, FIG. 3) is located at the central server to avoid duplication. The utility reads the system-event-log sequentially, starting with the most recent event, and continues to read and decode the events until the events are older than the predetermined time interval, e.g. one week (180, FIG. 4).

Figure 5:
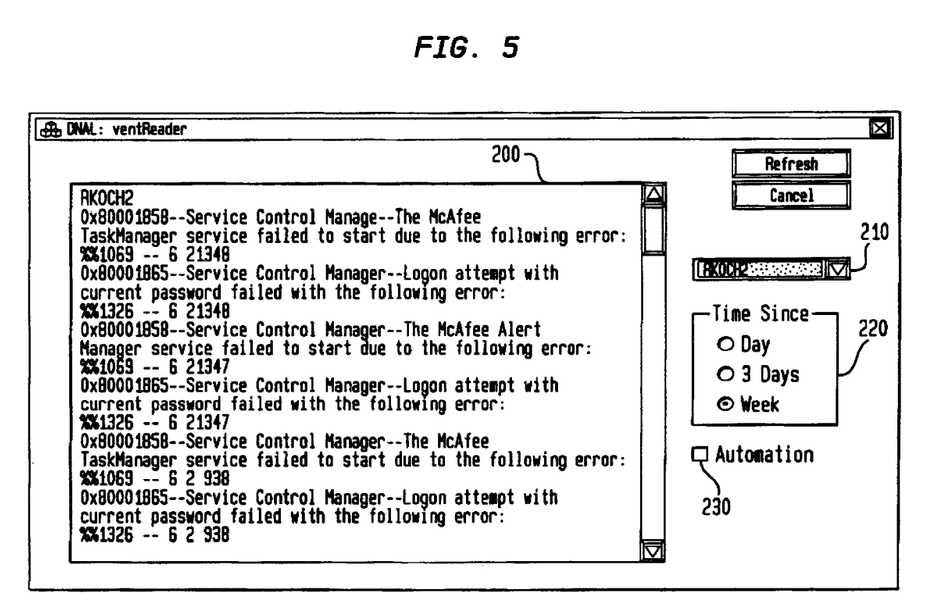
FIG. 5 is an interface for accessing information retrieved by a message retrieval utility of the present invention.

As shown in FIG. 5, the preferred event reader interface includes a scroll box 200 for displaying the events with an ID in hex format, the event type, the event source and a full description of the event on the selected workstation as decoded by the utility. At this point, the events have only been filtered to eliminate those with the lowest severity levels. The interface also allows for selection of a specific workstation 210 to view and the time interval of events to retrieve 220. If desired, the events may be automatically passed to the agent described below that will analyze the messages and report them to the administrator as needed 230 (see also 190, FIG. 4). Many other interface configurations are possible and specifically contemplated by the present invention. The exact interface is unimportant.

The message retrieval utility will preferably reside on each of the gateway servers of the remote groups. The utility at each gateway server will be preprogrammed with the network names of the workstations connected to it. Of course, as workstations are added or modified, the name list in the retrieval utility will be changed accordingly. The utility will automatically check the workstations for events that are sent to the event log at predetermined intervals. It is preferred that the message retrieval utility will only pass to the agent those event messages that are higher than the lowest priority messages. The remaining events will be sent to an agent, described fully below, on the gateway server, or one at a more centralized location.

Figure 3:
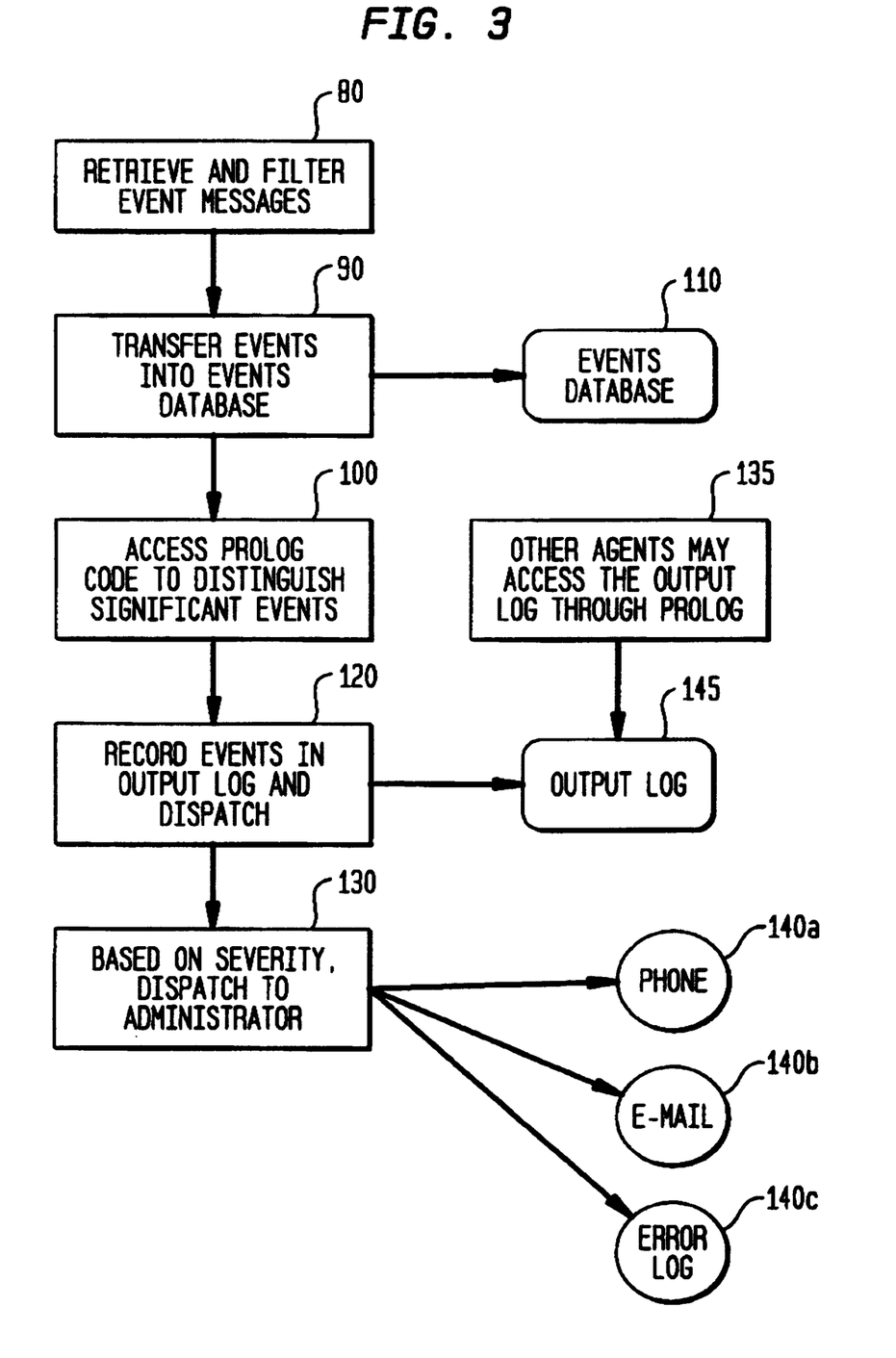
FIG. 3 is an overall functional schematic of the operation of the message retrieval utility and system agents according to the present invention.
Figure 6:
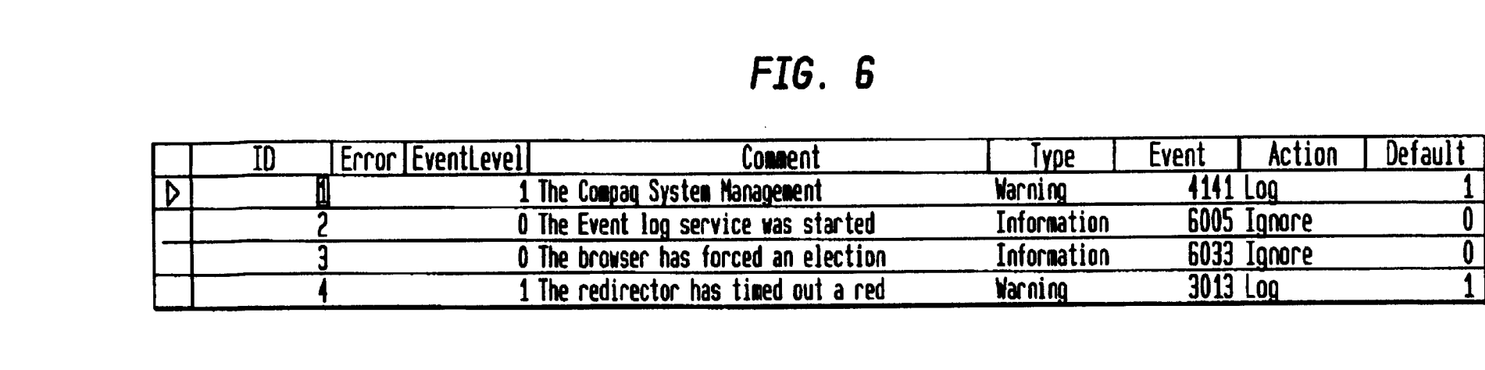
FIG. 6 is table of retrieved events.

Once the events have been read from the workstations, they are passed to the agent that filters the incoming messages (80, FIG. 3). The messages are analyzed and filtered to prevent administrators from being bombarded by insignificant events, such as an auto-check of the hard disk, while critical events are waiting to be handled. When the agent is first loaded, it accesses the events database and adds messages received from the retrieval utility (90, FIG. 3). This database contains a table of retrieved events, their severity level, a brief description and the actions to be taken when one of the events is encountered. The table also keeps track of whether actions taken are default actions generated by the agent, or user-defined actions. For any new event that does not have a user-defined action, the agent will generate a default action, such as logging the event to the administrator. Other actions include ignoring the event if it is of little or no consequence to the administrator. The events database (see FIG. 6) is preferably in the Microsoft® Access/SQL server database format.

Preferably, the database is loaded into an object-oriented environment, although any database architecture and code will work similarly. Once the database is loaded, Prolog code is used by the agent to quickly retrieve the event severity level and the action to be taken, although other artificial intelligence or decision matrix languages may be used similarly. As events are read from the database using the Prolog code, the resulting severity level and required action is recorded along with the event in an output log as described below (100, 120, 145, FIG. 3). Statistics are accumulated on events, with the ability of each agent to access the Prolog code to search the output log for patterns in system events (135, FIG. 3). This will give the agent the ability to determine what events are caused by other events, or what events may lead to other, more severe events.

As an example, the Prolog code may be configured to detect workstation failures. If such an event occurs, the pattern of events preceding the failure will be output to the log file with a high severity level, so that if the pattern occurs again, an agent will alert the administrator to a possible impending failure. Since any agents that are running share the common log file, all agents are then automatically alerted to the dangerous event pattern. In this manner, agents share information, and overall, become more intelligent as a group, rather than individually.

If an event is encountered by an agent that is not contained in the database, a default action is issued based on the severity level. For example, if a previously unknown error message is received, the default action is to log the event and ultimately report it to the administrator. The new event is then updated into the events Access/SQL server database. Subsequent occurrences of the new event will be responded to with the default action until the administrator decides to change the action.

To facilitate administrator changes to the events database, an editor is provided to permit the administrator to add events and change the severity level and action taken for different events. If desired, the editor will only recall and display those new events that were assigned default functionality. The administrator is also able to control which events are eligible for notification to the administrator and how the notification will occur.

Figure 7:
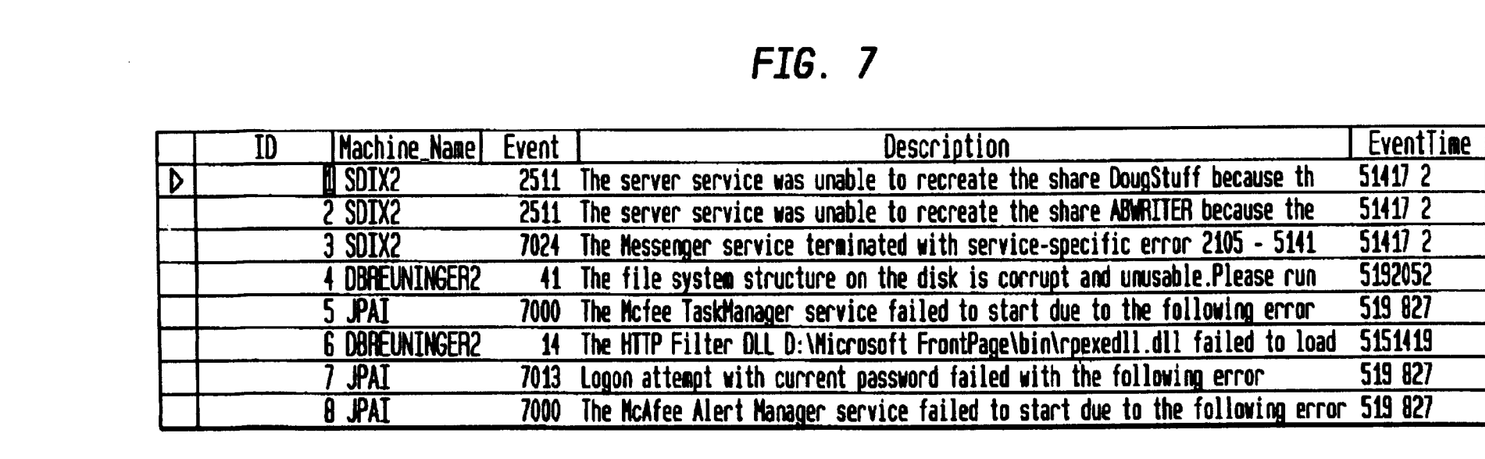
FIG. 7 is an output table of retrieved events.

As discussed, the agent adds significant events to the Access/SQL server output log. This output log is a table of all of the filtered events that occurred, as generated by all agents. As seen in FIG. 7, the output log includes the time and machine on which the event occurred, as well as the brief description of the event decoded by the agent. The output log is stored for reference by other agents, but not normally forwarded to the administrator in its complete form, since it includes an exhaustive list of the filtered recorded events, including less significant events.

Once the agent has filtered the events in the database according to the severity level of the events, messages are dispatched to the administrator as needed through a message dispatch service (130, FIG. 3). Preferably, the message dispatch service forwards the message according to the severity level. Low severity warnings are recorded in a message log (140c) and stored. This may either be part of the output log, or stored as a separate log of low severity warnings. Moderate severity warnings will generate an e-mail message (140b) that is sent to the system administrator. High severity warnings, such as workstation or server failure, that require immediate administrator attention or intervention, are forwarded perhaps by an automated phone call (140a), pager notification, or other urgent method.

The message dispatch service is preferably an OLE component written in C++. It supports a dual interface, so that its functionality can be called either through automation, or directly through its exposed interface. The code is preferably built on top of the Active X Template Library as a DLL. Due to the potential large volume of messages that might need to be handled, the dispatch service preferably launches a separate thread for dispatching each message. Since dispatching of some messages will require the automation of other applications, the threaded apartment model will be used. Other implementations of the same service are also contemplated.

In addition to those remote groups and workstations connected by an internal network, it is contemplated that the present invention may be implemented over the internet using any known protocol, preferably TCP/IP. In such a case, the message retrieval utility is split into server and client components to efficiently and accurately transfer the event message information to the agent for filtering and administrator notification.

The server component preferably runs on a central server. To accept data from remote groups, the server component will create a TCP/IP socket, bind to the appropriate port, cause the port to begin listening and then accept connections from clients, as is generally known. Once a connection is accepted, the program creates a new thread to manage the new client connection. This thread will go out of scope once the event data is transferred. This thread also acts as an OLE automation client to invoke the agent to perform its filtering and ultimate notification functions. The thread will identify the client machine, send back the acknowledgment for each packet received, reformat the raw data from the workstation and add the request to the agent. The thread will also write the filtered workstation specific events to the log file with the time stamp.

The client component is preferably written as a Windows NT service running as a background process on any remote machine, such as an individual workstation, or a gateway server. The main service thread (which keeps the background process running) reads the client workstation system-event-log every two hours, or other time interval. If an event with a high enough severity level is detected, the main service thread will launch a client socket thread. The client socket thread will create a TCP socket and connect to the server component IP address. The client socket thread gathers necessary information, such as the workstation name, user name, and data from the event log (decoded using the message DLLs on the workstation). This information is then broken into packets and transmitted to the server component until fully acknowledged, at which point the client socket thread exits. This NT service is preferably running as an automatic start mode, and configured as a default system account.

In a further embodiment of the invention, the agents created to filter the messages retrieved by the message retrieval utility may also be used to monitor and control the allocation of network resources in the distributed network. For example, each agent is capable of communicating with other agents. This may be accomplished in any known manner. It is preferred that interagent communication is accomplished by accessing the common log file through the Prolog code. Agents will broadcast to the other agents the event notification when any critical system resource, such as a network link between servers, is disrupted. This is in addition to the notification provided to the administrator. Each other agent will be configured to respond with a notification that resources of the same type are available, if no similar events have occurred with respect to that agent's resources. The response, for example, will elicit the central system to reallocate or redirect communications based on the responses of the other agents.

It is therefore seen that the message retrieval utility and agents of the present invention allow access to individual workstations to retrieve event messages. These messages are then intelligently filtered and forwarded by an agent to the administrator. Analyses of the event message may also be performed.

It is to be understood that the embodiments shown and described are shown for the purposes of illustration only and not for the purposes of limitation. Other embodiments are contemplated with minor variations that do not depart from the scope of the invention, the invention being only limited by the claims, as follows:

What is claimed is:

1. A system for monitoring remote workstations and reporting events associated with said workstations, comprising:

a remote workstation, said workstation having stored thereon a log of events identifiers of events occurring on said workstation, said workstation also having stored thereon libraries for associating said identifiers with said events;

a message retrieval utility for reading said event identifiers from said log on said workstation and decoding said events by reading said libraries on the same workstation as said log;

a central server having a database of events retrieved by the message retrieval utility; and an agent for segregating said retrieved events by severity level and forwarding notification of said events according to said severity level, said agent also writing filtered events to an output log for later reference by other agents.

* * * * *